C. CROUCH.
BRICKMAKING MACHINE.
APPLICATION FILED APR. 22, 1919.
1,331,323.
Patented Feb. 17, 1920.
2 SHEETS—SHEET 1.
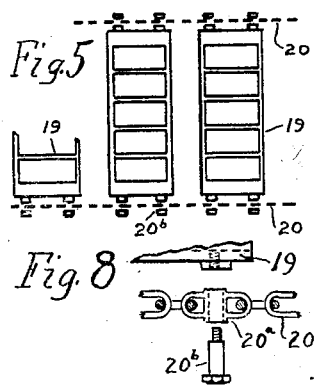
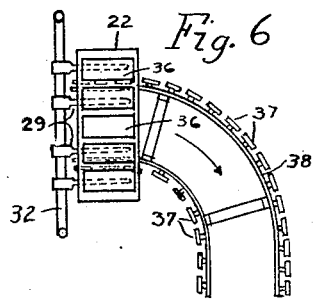
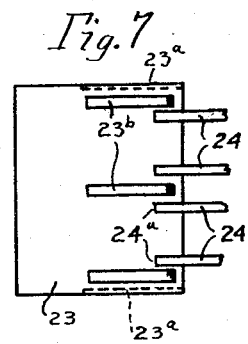
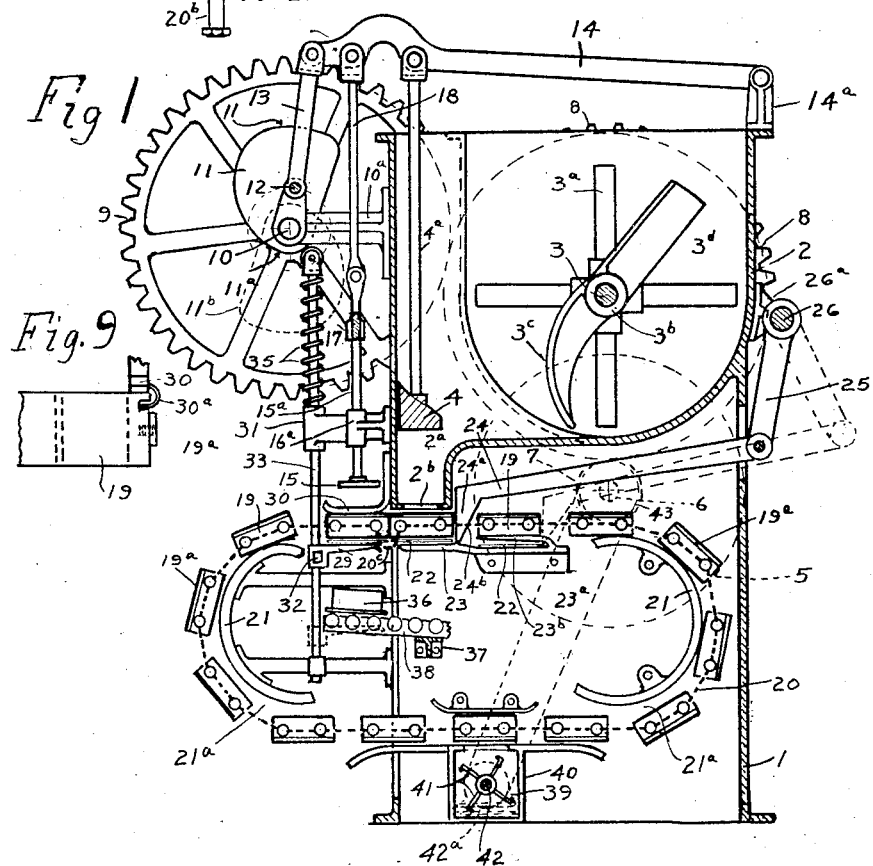
Inventor
Clayton Crouch
By
Fred E. Billman
Attorney

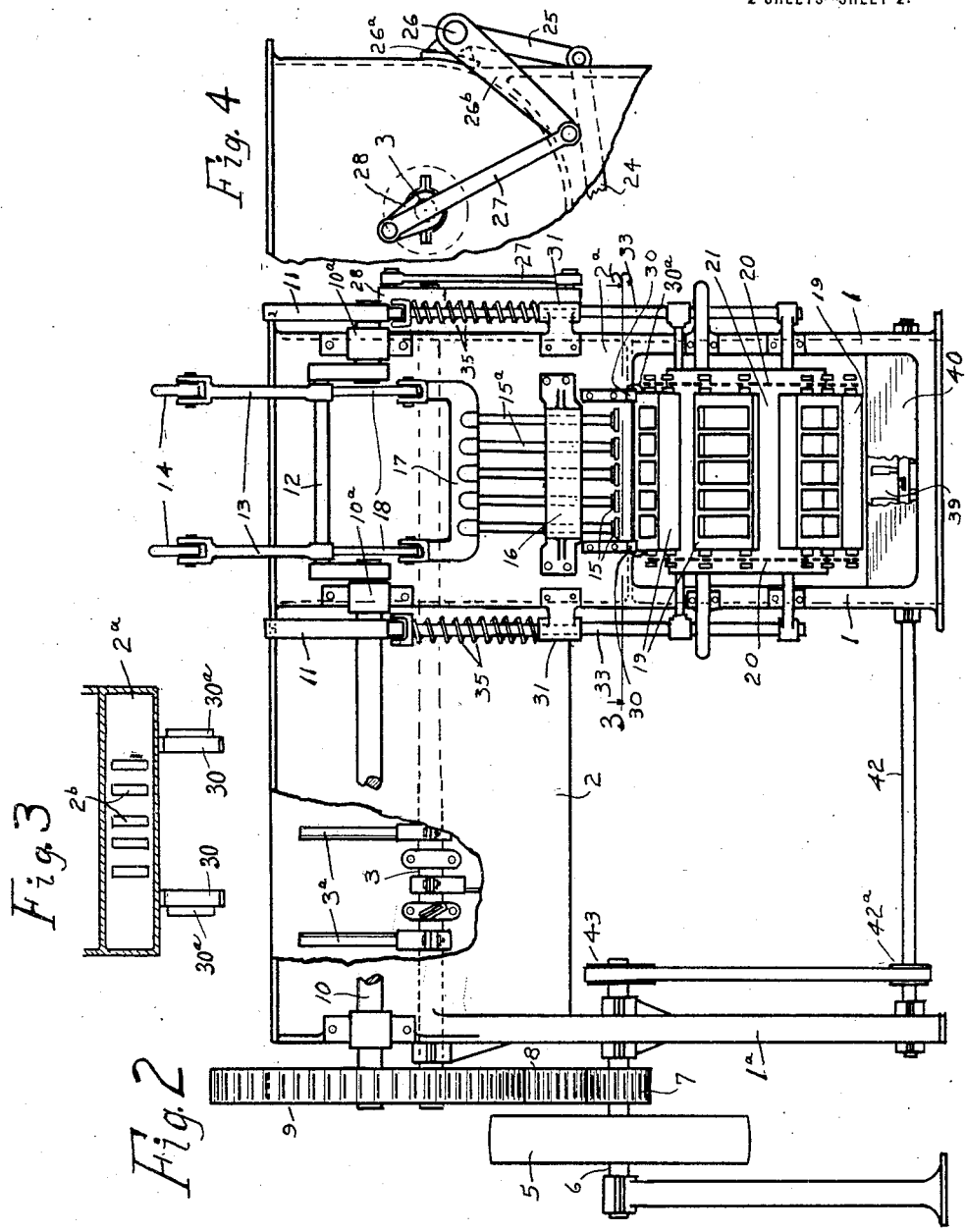

UNITED STATES PATENT OFFICE.

CLAYTON CROUCH, OF CLEVELAND, OHIO.

BRICKMAKING-MACHINE.

1,331,323.  Specification of Letters Patent.  Patented Feb. 17, 1920.

Application filed April 22, 1919. Serial No. 291,888.

*To all whom it may concern:*

Be it known that I, CLAYTON CROUCH, a citizen of the United States, residing at Cleveland, in the county of Cuyahoga and State of Ohio, have invented certain new and useful Improvements in Brickmaking-Machines, of which the following is a specification.

My invention relates to improvements in machines for making bricks, or analogous articles, the present embodiment of the invention relating more particularly to machines of this class or type in which molds are employed in connection with mold charging and discharging mechanism, together with improved means of mounting and feeding the molds and pallets, and also improved means for receiving the pallets and bricks as the latter are discharged or ejected from the molds by the mold discharging or ejecting mechanism.

The primary object of the invention is to provide a generally improved machine of this class or type which will be exceedingly simple in construction, cheap of manufacture, and efficient in use.

With the above mentioned and other ends in view, the invention consists in the novel construction, arrangement, and combination of parts, hereinafter described, and illustrated in one of its embodiments in the accompanying drawings, and particularly pointed out in the appended claims.

Referring to the accompanying drawings, forming a part of this specification, Figure 1, is a cross sectional view of a brick making machine constructed in accordance with this invention, two molds with their subjacent pallets being in their stationary abutting position at the mold charging and discharging portions of the machine, preparatory to having material pressed therein and ejected therefrom at the end of the working stroke or impulse of the intermittent mold chain actuating mechanism and preparatory to the return of such mechanism, as shown by the dotted lines, to its initial position for a new working stroke or feeding impulse.

Fig. 2, a front elevation of the same, certain portions of the mixing hopper being broken away for the purpose of clearer illustration of the parts.

Fig. 3, a longitudinal sectional view of the mold charging portion of the machine, taken on line 3—3 of Fig. 2.

Fig. 4, a fragmentary end view of the mixing hopper illustrating in particular the connecting mechanism between the mixing shaft and the mechanism for intermittently actuating or feeding the endless chain of molds.

Fig. 5, a fragmentary top plan view of the endless chain of molds, the chains being diagrammatically illustrated by dotted lines, as in Figs. 1 and 2 of the drawings.

Fig. 6, a fragmentary top plan view of the gravity conveyer and the pallets and brick receiving and lowering mechanism for receiving the pallets and bricks as the latter are successively ejected and discharged from the successive molds above and are delivered to the gravity conveyer.

Fig. 7, a top plan view of the pallet receiving table and the mold supporting arms superposed slightly above the table for initially receiving a pallet beneath said arms and the superposed mold and preparatory to the initial feeding movement of the latter and its subjacent pallet and the chain connected molds by the mold actuating or feeding mechanism.

Fig. 8, an enlarged fragmentary disassembled view of one of the endless mold chains and illustrating a flexible link or pivot connection therefor at the sides of the molds.

Fig. 9, an enlarged fragmentary top plan view of one of the mold retarding and supporting guide members at the mold discharging portion of the machine for supporting the mold only, as the brick and pallet are ejected and moved downwardly therefrom on the intermittently moving pallet and brick carrying mechanism coöperating with the subjacent gravity conveyer.

Similar numerals of reference designate like parts throughout all the figures of the drawings.

The improved machine comprises a suitable supporting frame or base, consisting, in the present instance, in a casing frame or base 1, at one end and a suitable end support 1ª, at the other, said supports 1 and 1ª, carrying a suitable mixing hopper 2, the latter being provided with a shaft 3, carrying a plurality of mixing blades 3ª, at one end and a plurality of pugging blades 3ᵇ, at the other. The pugging blades comprise wiper members 3ᶜ, and knife or cutter members 3ᵈ. The knife and wiper members 3ᵈ and 3ᶜ, communicate with a mold charging portion or neck 2ᵃ, the latter being provided at its bottom with reduced openings 2ᵇ, through which the material is adapted to be pressed into the molds by means of the vertically reciprocating plunger 4, operated as hereinafter described.

The machine is adapted to be operated by means of a pulley 5, mounted on a shaft 6, the latter being provided with a pinion 7, meshing with a gear wheel 8, connected to the end of the driving or pugging shaft 3. The gear wheel 8, meshes with a second gear wheel 9, the latter being mounted on a shaft 10, mounted in suitable bearings 10ᵃ, extending from the front of the mixing hopper or casing 2. The shaft 10, is provided with a pair of cams 11, and is also provided with an intermediate crank arm 12, said crank arm 12, being connected to connecting rods or links 13, said links 13, being connected to the ends of overhanging levers 14, the latter being connected in suitable bearings 14ᵃ, at the rear of the machine hopper.

As a means of simultaneously actuating the mold charging plunger 4, and the mold discharging plungers 15, the plunger 4, is provided with stem portions 4ᵃ, pivotally connected to the free ends of the levers 14, and the mold discharging or brick ejecting plungers 15, are provided with stems 15ᵃ, slidably mounted in a guide bracket 16, and mounted on the front of the mixer casing, said guide stems 15ᵃ, being mounted in a cross head or bracket 17, pivotally connected to connecting links 18, leading upwardly to the vertically movable ends of the overhanging levers 14.

Referring now to the improved molds and mold and pallet mounting, handling and actuating mechanism, to which this invention particularly relates, it will be seen that I provide an endless chain of molds regularly spaced from each other and flexibly connected in any suitable and convenient manner, said flexible connection, in the present instance, comprising chain members 20, connected to the sides of the molds by means of bearing links 20ᵃ, (see Fig. 8) mounted on bearing bolts 20ᵇ. It will be seen that the molds 19, are provided with brick receiving openings extending vertically therethrough so that the material may be received at one side and ejected from the other by the mold charging and discharging plungers, hereinbefore referred to.

As a convenient means of mounting and guiding the endless chain of molds 19, as actuated, as hereinafter described, the machine is provided with suitable mold supporting and guiding members, said supporting and guiding members, in the present instance, being in the specific form of curved bracket members 21, secured to the sides of the frame casing 1, and adapted to support the ends of the endless chain of molds 19, as shown most clearly in Fig. 1 of the drawings.

As a means of supporting the endless chain of molds so that the upper pass of the same may be buckled for bringing two adjacent molds therein into abutting position by the actuating mechanism, as hereinafter more fully referred to, and whereby the lower pass of the endless chain of molds will have sufficient slack to permit of such buckling action in the upper pass, it will be seen that the supporting and guiding members 21, are so spaced as to provide a space 21ᵃ, at the ends and lower portions of the members 21, and thus providing some slack in the lower pass of the endless chain of molds.

As a means of successively providing each mold with a pallet 22, before the latter and the superposed mold 19 are intermittently actuated and fed into the mold charging and discharging portions of the machine, a pallet receiving table 23, is mounted between the walls of the casing frame 1, by means of brackets 23ᵃ, and as a means of supporting the mold 19, above the table 23, so as to provide an intervening space for the reception of the pallet 22, the table 23, is provided with a plurality of mold supporting arms 23ᵇ, it being obvious that when the mold is thus supported the pallet may be readily inserted manually from one side of the machine.

As a means of intermittently actuating the molds 19, in proper timed or synchronous relation to the plunger members 4 and 15, the mold actuating mechanism preferably comprises a plurality of mold actuators, in the specific form of pusher bars 24, having heads 24ᵃ, adapted to successively engage at the rear of the molds 19, and having inclined portions 24ᵇ, adapted to ride over the molds as moved rearwardly for successive actuation and to drop at the rear of the molds, as indicated by the dotted lines in Fig. 1 of the drawings, said pusher bars 24, being pivotally connected to arms 25, carried on a rock shaft 26, mounted in suitable bearings 26ᵃ, on the machine casing.

As a means of actuating the rock shaft 26, the latter is provided with an arm 26ᵇ, connected to a connecting rod 27, (see Fig. 4) the latter connected to an arm 28, on the shaft 3.

As a means of retarding the mold 19, at the brick discharging portion of the machine, so that the molded material in the openings will register with the plungers 15, above, and also as a means of providing for a buckling of the chain 20, as at 20ᶜ, between the two molds, as shown most clearly in Fig. 1 of the drawings, and also as a means of supporting the mold while the bricks and pallets are moved downwardly therefrom by the pallet receiving and lowering arms 29, mounted and operated as hereinafter described, the brick or mold discharging portion of the machine is provided with mold retarding and supporting guide members 30, having spring side members 30ª, adapted to operate in side grooves 19ª, of the molds 19, as shown most clearly in Fig. 9, of the drawings.

As a means of lowering and returning the pallet and mold receiving arms 29, while the molds 19, are being given a feeding impulse, and after the bricks are ejected therefrom, the arms 29, are mounted on a cross bar 32, carried on vertical plunger shafts 33, the latter being mounted in guides 34, and being spring resisted by means of surrounding coil springs 35, the upper ends of said plunger arms 33 being provided with rollers adapted to ride upon and be actuated by the cams 11, on the shaft 10. It will be seen that the cams 11, are provided with dwell portions 11ª, so as to hold the arms 29, in a substantially fixed position at the extreme throws of the shafts 33.

At the extreme lower position of the pallet and mold carrying arms 29, as shown by dotted lines in Fig. 1 of the drawings, the pallets 22, and superposed bricks 36, are deposited upon the gravity rollers 37, on the curved track-way 38, and are carried therefrom in the direction of the arrow, as shown most clearly in Fig 6, of the drawings.

As a means of coating the interiors of the molds with parting material, such as sand, lubricant, or the like, the molds are adapted to pass above a lubricant or sanding chamber 39, in the casing 40, such parting material being adapted to be agitated and thrown upwardly by means of arms 41, on a shaft 42, receiving its motion from a pulley 42ª, communicating with a second pulley 43, on the driving shaft 6.

From the foregoing description, taken in connection with the accompanying drawings, the operation and advantages of my invention will be readily understood.

Having thus described one of the embodiments of my invention, what I claim and desire to secure by Letters Patent, is:—

1. In a machine having an operating station, an endless slack chain of spaced flexibly connected receivers, and means for initially moving a part of said receivers into abutting relation and then moving the same forwardly thereby actuating the whole chain.

2. In a machine having an operating station, an endless slack chain of spaced flexibly connected receivers, and means for initially moving a part of said receivers into abutting relation and then and thereafter actuating the whole chain as said abutting receivers are further moved.

3. In a machine having an operating station, a plurality of spaced flexibly connected holders arranged in endless slack chain form forming adjacent passes, means for supporting said chain of holders and forming a slack in a portion of said chain between said abutting receivers, and thereby picking up slack in the other portion of said chain.

4. In a machine, including a charging station, an endless slack chain of flexibly connected receptacles, means for retarding said receptacles at the charging station, means for forming slack in one pass of said chain, and means for moving successive receptacles into abutting relation to each other and forming a buckle in said chain at said charging station.

5. In a brick making machine, an endless slack chain of spaced flexibly connected molds, means for retarding said molds in one pass of said chain, means for supporting said chain of molds and forming slack therein in the other pass thereof, and means for moving said molds into abutting relation and forming a buckle between the abutting molds in conjunction with said mold retarding means.

6. In an operating machine, a processing station, a plurality of spaced flexibly connected receivers arranged in endless chain form forming adjacent passes, and means for supporting said chain of receivers and forming slack in one pass of said chain between receivers when the latter are moved to abutting position thereby taking up slack in the other pass of said chain.

7. In a machine having operating and discharging stations, an endless yieldably mounted chain of spaced flexibly connected receptacles, means for successively engaging said spaced receptacles and first moving the same into abutting relation forming slack in said chain in one pass and then moving the same in such abutting position past said operation position and thereby moving the whole chain.

8. In a machine, including charging and discharging stations, a plurality of spaced molds arranged in flexibly connected yieldably mounted endless chain form, means for supporting and guiding the same in passes, and means for intermittently actuating said endless chain form by successively engaging and actuating receptacles in one pass into abutting relation and then moving the same in such relation thereby actuating the whole chain.

9. In a brick making machine having mold charging and discharging portions, and a loosely mounted endless chain of flexibly connected spaced molds, means at the discharging portion of said machine for retarding said molds, means for supporting said molds as the material is discharged therefrom, means for feeding molds in abutting relation to said mold charging mechanism, and means for receiving the discharged material from said molds as discharged.

10. In a brick making machine, an endless chain of spaced molds, means for retarding said molds in one pass of said chain, means for yieldably supporting said chain of molds thereof, and means for successively engaging and moving said molds into abutting relation with each other and forming a buckle in the retarded portion of said chain between said abutting molds in conjunction with said mold retarding means.

11. In a brick making machine having mold charging and discharging portions, and an endless yieldably supported chain of flexibly connected spaced molds, means at the discharging portion of said machine for retarding said molds, means for supporting the sides of said molds as the material is ejected therefrom, means for successively engaging and feeding molds into abutting relation beneath said mold charging mechanism, and means for receiving the discharged material from beneath said molds during the mold discharging operation.

12. In a brick making machine, a plurality of molds arranged in flexibly connected endless chain form, means for yieldably supporting and guiding the same, means for intermittently actuating said chain form by successively engaging and actuating molds in abutting form in one pass of said endless chain form, means for simultaneously filling and discharging brick forms into and out of molds when at rest, and means for receiving and lowering brick from beneath said molds as discharged from said molds between the intermittent movements of said chain form.

13. In a brick making machine, an endless chain of flexibly connected spaced molds, means for supporting the same to provide opposite passes, mold charging and mold supporting means arranged in proximity to one pass of said chain of molds, mold discharging mechanism arranged in proximity to a pass of said chain of molds, means for intermittently actuating said molds, means for retarding the forward mold as passed through said mold charging mechanism, and means for initially receiving the discharged brick as discharged from said molds and then lowering the same.

14. In a machine, including an operating or processing station and an endless chain of flexibly connected receptacles, means for supporting and guiding the same whereby slack will form in one pass of said chain between adjacent receptacles and slack will be taken up in the opposite pass thereof, and means for successively engaging said receptacles of said chain for first initially moving the adjacent receptacle into abutting relation with the forward adjacent receptacle, and then finally passing the receptacles into and out of the charging and discharging stations of said machine.

15. In a brick making machine, an endless chain of flexibly and loosely connected spaced molds, means for supporting the ends thereof to provide opposite passes, mold supporting means arranged in proximity to one pass of said chain of molds, mold discharging mechanism arranged in proximity to said pass of said chain of molds in front of said mold supporting means, means for intermittently moving spaced molds into abutting relation and then moving said chain, means for retarding the forward mold as passed through said mold discharging mechanism, and means for initially receiving the discharged brick as discharged from said molds and then lowering the same between the intermittent movements of said molds.

In testimony whereof I have affixed my signature.

CLAYTON CROUCH.